United States Patent [19]
Taylor

[11] Patent Number: 5,813,632
[45] Date of Patent: Sep. 29, 1998

[54] SALVAGE HARDWARE APPARATUS AND METHOD FOR ORBITING OBJECTS

[76] Inventor: Thomas C. Taylor, 3705 Canyon Ridge Arc, Las Cruces, N. Mex. 88011

[21] Appl. No.: 537,531

[22] Filed: Oct. 2, 1995

[51] Int. Cl.$^6$ ...................................................... B64G 1/64
[52] U.S. Cl. .................... 244/159; 244/158 R; 244/172; 244/173
[58] Field of Search ................................ 244/158 R, 159, 244/160, 161, 172, 173

[56] References Cited

U.S. PATENT DOCUMENTS

| | | |
|---|---|---|
| 4,650,139 | 3/1987 | Taylor et al. . |
| 4,790,499 | 12/1988 | Taylor et al. . |
| 5,092,545 | 3/1992 | Butterfield et al. ................. 244/158 R |
| 5,094,409 | 3/1992 | King et al. ........................... 244/158 R |
| 5,133,517 | 7/1992 | Ware ................................... 244/158 R |
| 5,350,138 | 9/1994 | Culbertson et al. ............ 244/158 R X |
| 5,421,540 | 6/1995 | Ting ..................................... 244/160 X |
| 5,511,748 | 4/1996 | Scott ........................................ 244/161 |

FOREIGN PATENT DOCUMENTS

| | | | |
|---|---|---|---|
| 5278698 | 10/1993 | Japan ................................. 244/158 R |

OTHER PUBLICATIONS

Lovece, Joseph A., "The Impending Crisis of Space Debris", Astronomy, Aug. 1987, pp. 6–13.

*Primary Examiner*—William Grant
*Attorney, Agent, or Firm*—Jones & Volentine, L.L.P.

[57] ABSTRACT

An aerospace hardware package is used to salvage derelicts in space. The package incorporates at least the subsystems required to salvage and reuse portions of previously discarded launch vehicle components and other derelict objects in space. The salvaged items include the external tank of the space shuttle, and the Russian-made ENERGIA rocket system in two forms. The salvaged hardware is capable of contributing mass, length, exterior surface, strongback, gravity gradient stability, interior volumes, base metal sources and stability with the addition of a salvage subsystems package. The package supplies capabilities such as power and communications and later evolves toward more complex services taking full advantage of the salvaged hardware's attributes to reduce the cost and difficulty of space operations.

18 Claims, 13 Drawing Sheets

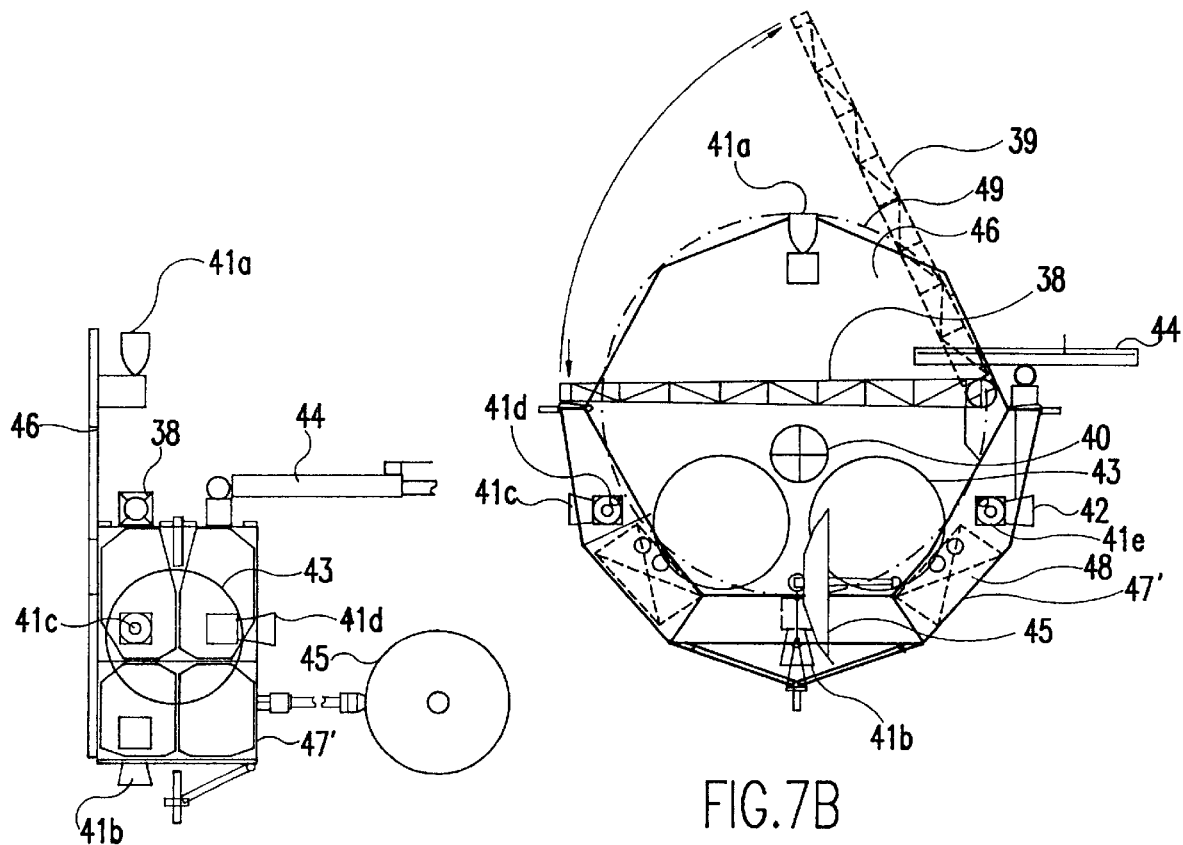
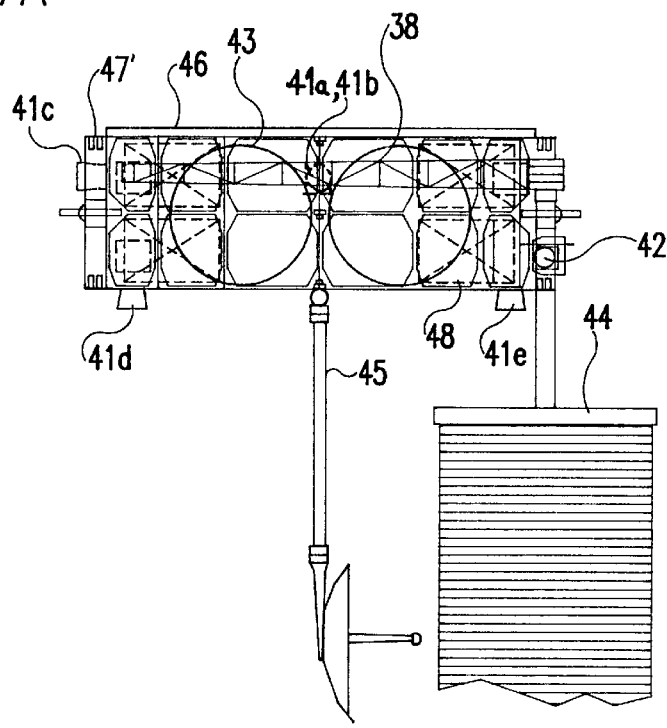
FIG.7A
FIG.7B
FIG.7C

SALVAGE HARDWARE APPARATUS AND METHOD FOR ORBITING OBJECTS

BACKGROUND OF THE INVENTION

1. Field of the Invention

The present invention generally relates to the salvage and reuse of aerospace hardware and space objects, and, more particularly, to a series of techniques or methods combined with salvage subsystem packages including electronics, propulsion, and communications components that are placed in orbit to salvage existing or future aerospace objects for reuse.

2. Description of the Related Art

Previous launches of space vehicles to orbit have used a staging process, which uses and discards a series of one or more propulsion and/or propellant container components.

The Space Shuttle orbiter, for example, utilizes three main engines, a large (154 foot) and relatively simple propellant container or external tank containing liquid hydrogen and liquid oxygen in two internal tanks, and two solid rocket boosters (SRB) for lift off. The orbiter lifts off using the combined thrust of the two solid propellant booster rockets and the three main engines. After approximately two minutes the solid rocket boosters are jettisoned, while the orbiter and external tank continue to ascend using the thrust of the three main engines. Approximately 8.6 minutes after launch, at a height of about 75 miles, and just short of orbital velocity, the three space shuttle engines are shut down (main engine cutoff), and the external tank is jettisoned on command from the orbiter. The external tank continues on a ballistic trajectory and enters the atmosphere where it breaks up at a high altitude and most of the pieces disintegrate. Some larger components may remain intact and they will impact the ocean. The orbiter proceeds to orbit using a series of two Orbital Maneuvering System Engine burns to boost its speed to about 17,500 MPH to enter orbit.

In this above described shuttle launch sequence, the external tank is taken to 98% of full orbital velocity before being separated. The energy invested in the 66,250 pounds (dry) of the external tank is valued at from $132 to 994 million if the mass was to be launched by a launch vehicle. The external tank is composed of aluminum and is protected from temperature extremes during lift-off and ascent by a thick plastic foam. If some orbital use could be made of the external tank or its salvage aluminum and other metals, then some of the invested energy value could be realized.

Even before the first Space Shuttle launched, a number of people and organizations suggested taking the external tank to orbit. In the 1970's, Dr. Gerald K. O'Neil of Princeton University and the Space Studies Institute proposed that the tank be used for reaction mass for mass drivers and a number of other uses. The logical conclusion of many at the time was to take the tank the remaining 2% into orbit, but the technical details for the operation were vague.

In mid—1979 Thomas C. Taylor began to propose various external tank applications in orbit in a funded study for Martin Marietta, Denver Aerospace, Michoud Operations Advanced Programs, December 1979, "ET Applications in Space", Study Contract Final Report. This and a series of follow-on contracts proposed a number of uses for the external tank in orbit including an aft cargo pod, shuttle derived vehicles, inspections of the thermal protection system of the external tank, and tether operations.

Shuttle derived vehicles or combinations take components from the existing shuttle system and use them in new ways, or create new combinations with the addition of other components.

The external tank thermal protection system (TPS) consists of four types of spray-on and hand-placed types of foam materials that are used to protect the tank at the launch pad from ice formation and on ascent to keep the cryogenic components cold. After gathering data on the first few shuttle flights, the tank's TPS design was optimized and it was found that some of the TPS could be safely removed. Inspecting the external tank in orbit would allow designers to assess the foam after ascent and further refine the TPS.

Tether operations in space may be performed using an aerospike attached to the external tank. As described in U.S. Pat. Nos. 4,650,139 and 4,790,499 to Taylor et al., an aerospike is a spike like projection built on the front of the tank to reduce its drag. The aerospike may also be used as a structural attachment point in orbit to attach a maneuvering tether tip to the external tank.

Efforts continue to refine procedures for taking the external tank to orbit, including optimizing the present shuttle trajectory, delaying the external tank separation from the orbiter, and changing the number and location of the additional propulsion burns required to place the orbiter in orbit. The resulting baseline Direct Insertion Trajectory adds some performance enhancement to the system, reduces the required Orbital Maneuvering System Engine burns to attain orbit, and floats or lofts the external tank for a period of time to later re-enter the earth's atmosphere over the Pacific Ocean.

Software, safety and other issues still preclude taking an external tank to orbit, but efforts are ongoing and it appears likely that the external tank will eventually be placed in orbit.

Regardless of whether external tanks are routinely placed in orbit, there are numerous discarded aerospace vehicle components currently in orbit, all of which must be controlled and maintained to comply with the United Nations Treaty on Outer Space, which places the responsibility for the liability for re-entry damage on the launcher nation.

Previous solutions and trajectories have added to the knowledge base of the external tank to orbit solution, but failed to overcome all the barriers. Importantly, none of the prior art solutions propose a complete launch to orbit and salvage solution. Most other launcher organizations also seem to ignore the potential of salvage of currently discarded launch vehicle components. In the commercial world this salvage could provide significant economic leverage.

In light of the foregoing, there exists a need for an apparatus and method for salvaging derelict objects in space.

SUMMARY OF THE INVENTION

The present invention is directed to a salvage subsystem having electronics, propulsion, and communications components, which substantially obviates one or more of the problems due to the limitations and disadvantages of the related art.

The present invention provides a reusable, commercial facility in orbit capable of cost effective service from a salvageable item of space hardware. A principal object of the present invention is therefore to salvage in orbit currently discarded components of aerospace launch vehicles and satellites by placing salvage subsystem control packages on the discarded launch components. The salvage subsystem may be preplaced on the salvageable object or placed on the object after the object is in orbit. For example, the existing orbital hardware could be modified before launch to accept the subsystem package. Also, by using the space shuttle's Remote Manipulator System (RMS) and EVA crew member assistance, one can place an attitude control, re-entry propulsion and communications subsystems package on the salvaged derelict in orbit.

One advantage of this invention is the launch of a space hardware item previously designed for one use may be reused for a different purpose in orbit, thereby providing a significant cost savings since the cost of the launch was already paid for by the first use. Also, if it is known that a particular component is capable of additional uses in space, a cost sharing arrangement prior to launch would significantly reduce the component cost.

Still another object of the present invention is to reduce the cost of doing business in orbit by using a derelict as a portion of an orbital platform created with a portion of the subsystem package used in the salvage the derelict.

A further object the present invention is therefore to delay the re-entry of currently discarded components of aerospace launch vehicles and satellites by placing a minimum control package on the discarded component to provide a new source of base metal and salvage of valuable components.

Another advantage is to more completely use the existing propellants and other attributes of the salvaged item, or salvage other man made and non man made items in space.

To achieve these and other advantages and in accordance with the purpose of the invention, as embodied and broadly described, the invention provides for a method of placing a separate salvage subsystem package on a discarded orbiting object for salvaging the discarded orbiting object, the method comprising the steps of: identifying a discarded orbiting object; launching the separate salvage subsystem package; coupling the salvage subsystem package to the discarded orbiting object; and activating and controlling the salvage subsystem package to provide a plurality of controls for the discarded orbiting object.

In another aspect, the invention is a salvage subsystem package attached to a discarded orbiting object for salvaging the discarded orbiting object, the package comprising: attitude control means for controlling the attitude of the discarded orbiting object; communications means for controlling the communications of the discarded object; power means for supplying power to the orbiting discarded object; and extendable truss means for receiving future space payloads.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which:

FIGS. 7A–7C show side, front, and top assembly views of the subsystem package containing 4 to 10 KW power, communications, attitude control and other services;

DETAILED DESCRIPTION OF A PREFERRED EMBODIMENT OF THE INVENTION

The salvage of derelict launch vehicle components in accordance with the present invention includes the introduction of a salvage subsystem package to an existing launch vehicle component for the purpose of increasing the control of the object and salvaging it in orbit or in space for further use.

Several of the Figures illustrate orbital salvage operations involving shuttle external tanks or Russian-made ENERGIA rockets. As discussed above, while these systems are currently jettisoned prior to orbit, efforts are underway to provide for orbital entry of these systems. The present invention, however, is not limited to salvage operations of those illustrated. The operations, techniques, and subsystem salvage packages of the present invention may be utilized with any derelict object in space such as discarded space hardware or satellites.

Figure 1:
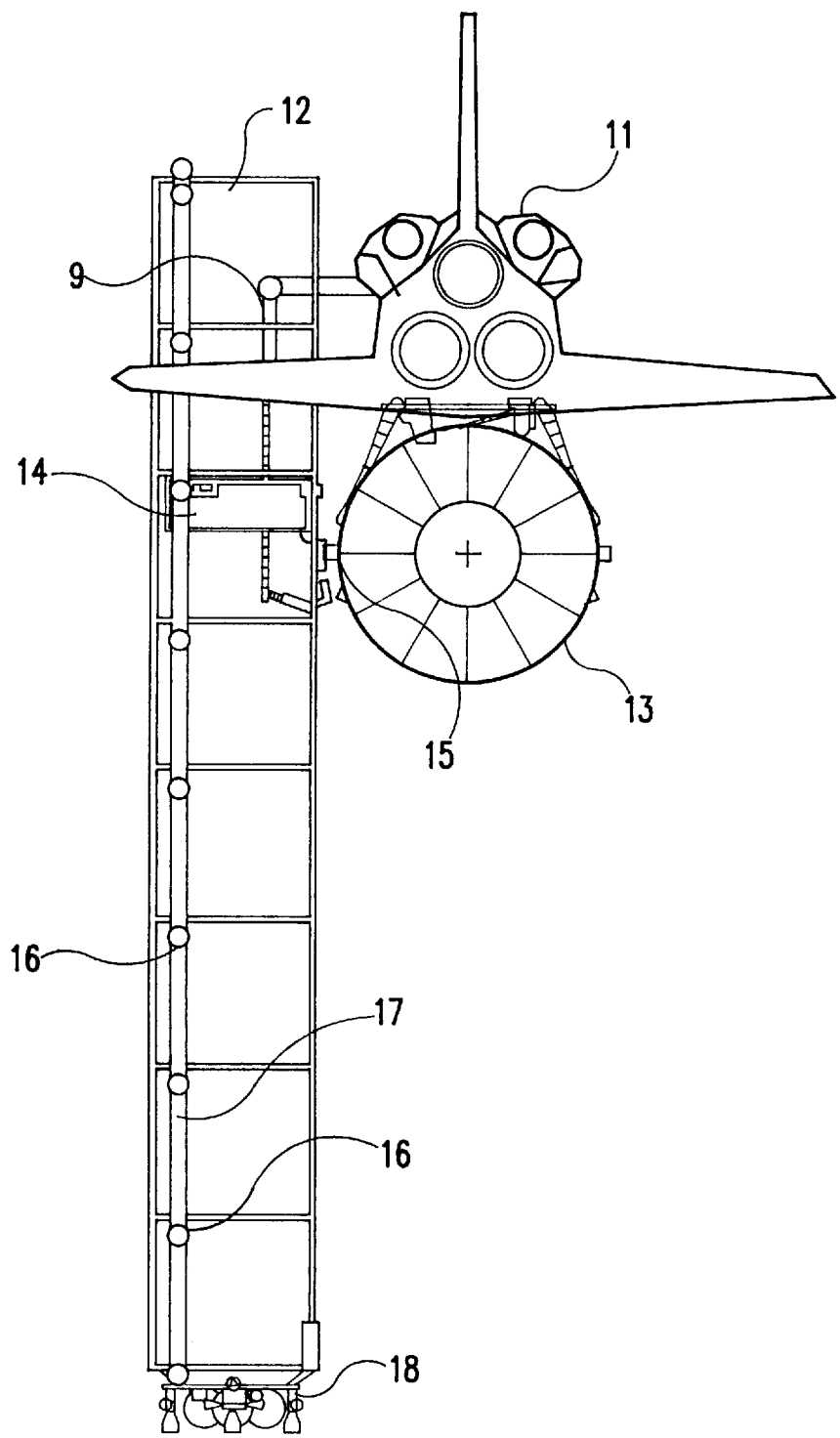
FIG. 1 is a side view of a preferred embodiment of the salvage subsystem placed on the external tank of the shuttle orbiter by the Remote Manipulator System (RMS) before the tank is separated in orbit.

Referring now to the drawings, and more particularly to FIG. 1, there is shown a overall view of an embodiment of the invention that may be utilized to salvage a shuttle external tank.

Space shuttle 11 is shown in orbit just prior to jettisoning the external tank 13. A salvage subsystems package 14 is used in conjunction with a compressed, but erectable and expandable truss 12 to salvage the external tank. This predesigned subsystems package 14 is attached to the external tank at attachment point 15 by the shuttle's Remote Manipulator System (RMS) arm 9. The components of the salvage subsystem 14 will be described in greater detail later in the specification.

In like respect, if a space hardware derelict or satellite was to be salvaged, the shuttle could maneuver in close proximity to the salvageable object, capture the object with its RMS, and thereafter place the subsystem salvage package 14 on the salvageable object.

With particular reference to the external tank 13, the attachment point 15 may be the Solid Rocket Booster (SRB) attachment point. Equivalent attachment points 15 may already be available on the salvageable hardware or satellite. In addition, a suitable attachment device may be incorporated into the salvage subsystem package for mating with the salvageable object if no pre-existing attachment point was provided.

The salvage subsystem package 14 uses the erectable, expandable truss 12 and a utility network 17 with attachment points for payloads at nodes 16 for connection to power, communications and other services provided by the salvage subsystem 14.

The subsystem package 14 also provides power communications and control of the propulsion package 18. The propulsion package 18 may be used for orbital maneuvers or for controlling re-entry.

Figure 2:
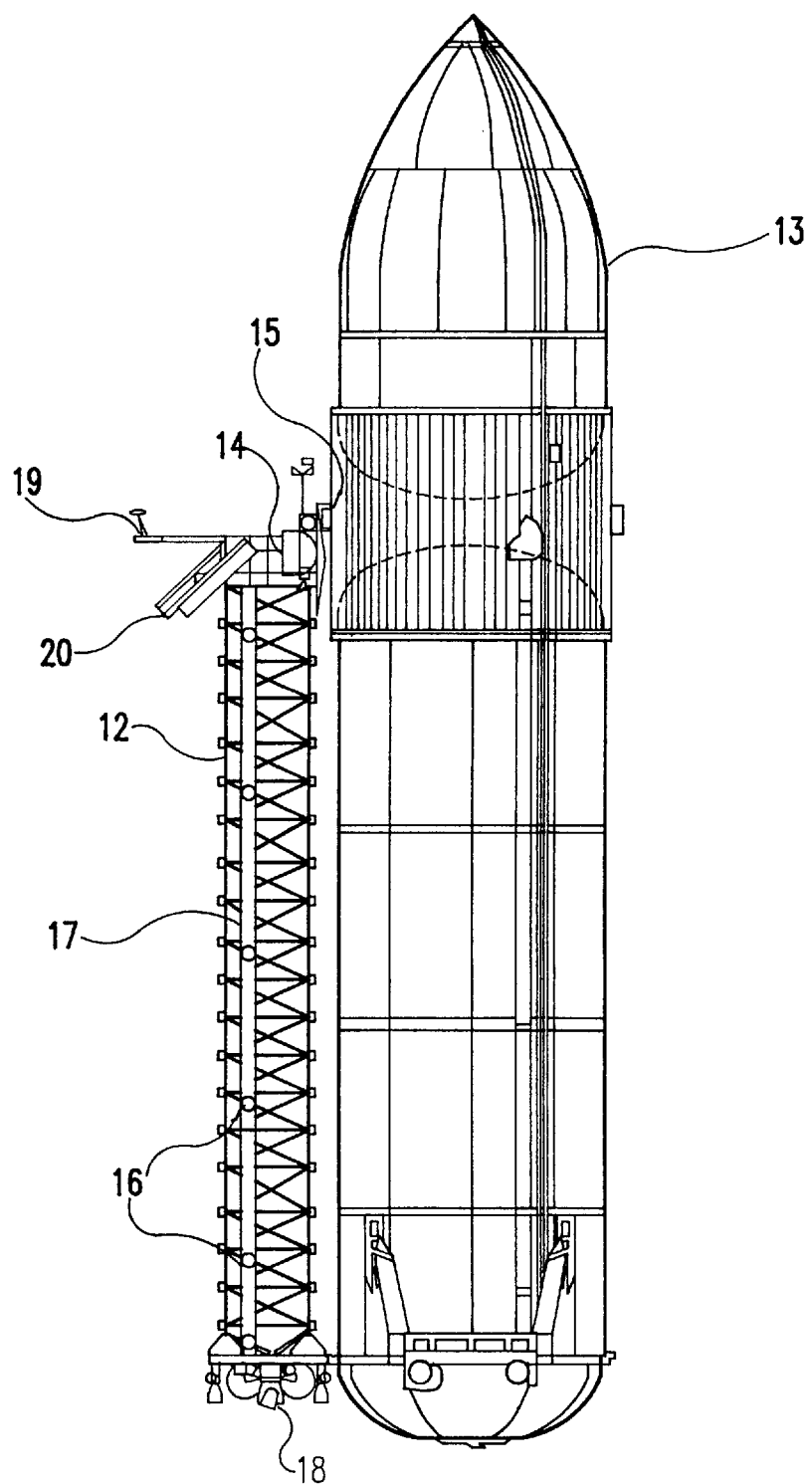
FIG. 2 is a side view of the deployed salvage subsystem package connected to the external tank.

FIG. 2 is a side view of the salvage subsystem 14 and extended truss platform 12 showing the external tank 13 and the subsystem package 14 attached to the external tank at attachment point 15. As described further below, the salvage subsystem package provides attitude control, re-entry and other services to the combination of systems. Also shown in FIG. 2 are communications antennas 19 and solar arrays 20 for powering the system.

Figure 3:
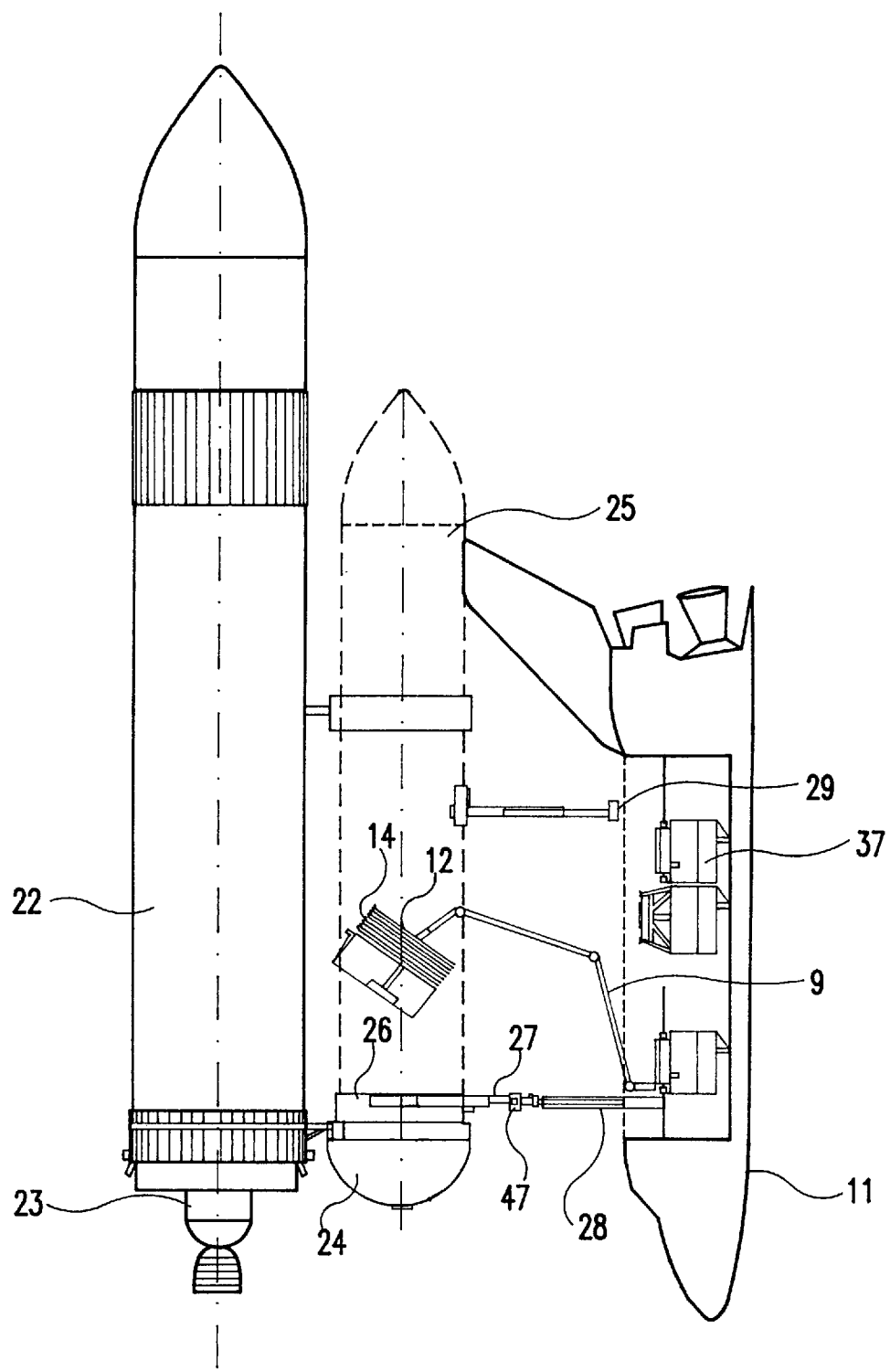
FIG. 3 is a side view of a compressed salvage subsystem being placed on a Russian-made ENERGIA rocket.

FIG. 3 is a side view of a prospective salvage operation involving the Russian-made ENERGIA rocket. The ENERGIA rocket consists of a central core 22, reusable engines 23, and a payload carrier 24 that had a previously filled payload volume 25, represented as a dashed line. This ENERGIA rocket apparatus is currently discarded on each mission.

According to the present invention, the rocket system can be salvaged using the Space Shuttle 11 to place a salvage subsystem package 14 with the compressed, but extendable truss 12 on-board. The salvage package 14 and deployable truss 12 is attached to the payload carrier 24 by the Remote Manipulator System (RMS) Arm 9 at the pre-installed interface package 26. The truss 12 is later expanded to provide attitude control, re-entry and other services to the combination of systems.

Prior to placing the salvage package on-board, the Shuttle 11 and ENERGIA system mate by using a pre-installed spar pole 27 launched with the ENERGIA vehicle payload carrier 24. The spar pole 27 and the spar pole 28 on the Shuttle 11 are connected by coupling testbed 47 with the assistance of the RMS 9. The spar poles are non-rigid telescoping poles permitting the RMS 9 to connect to another massive object in space without forcing the RMS 9 to be the single structural link between the two massive objects 22, 24 and the Space Shuttle 11.

A problem in microgravity is that in a face-on approach, the thrusters from one mass maneuvering in space react against the other mass sought to be joined, thereby causing it to move unpredictably. The spar poles allow one mass to approach from above or below and maintain alignment with non-impinging thrusters and robotically attach a non-rigid spar pole to the other mass. The spar poles are rigidized upon astronaut command and can be adjusted to make the final berthing and docking attachments as required.

The extension of a third aft spar pole 29, along with spar poles 27 and 28, are controlled and later rigidized to adjust and decrease the closing impact on the massive objects 11, 22, and 24.

Figure 4:
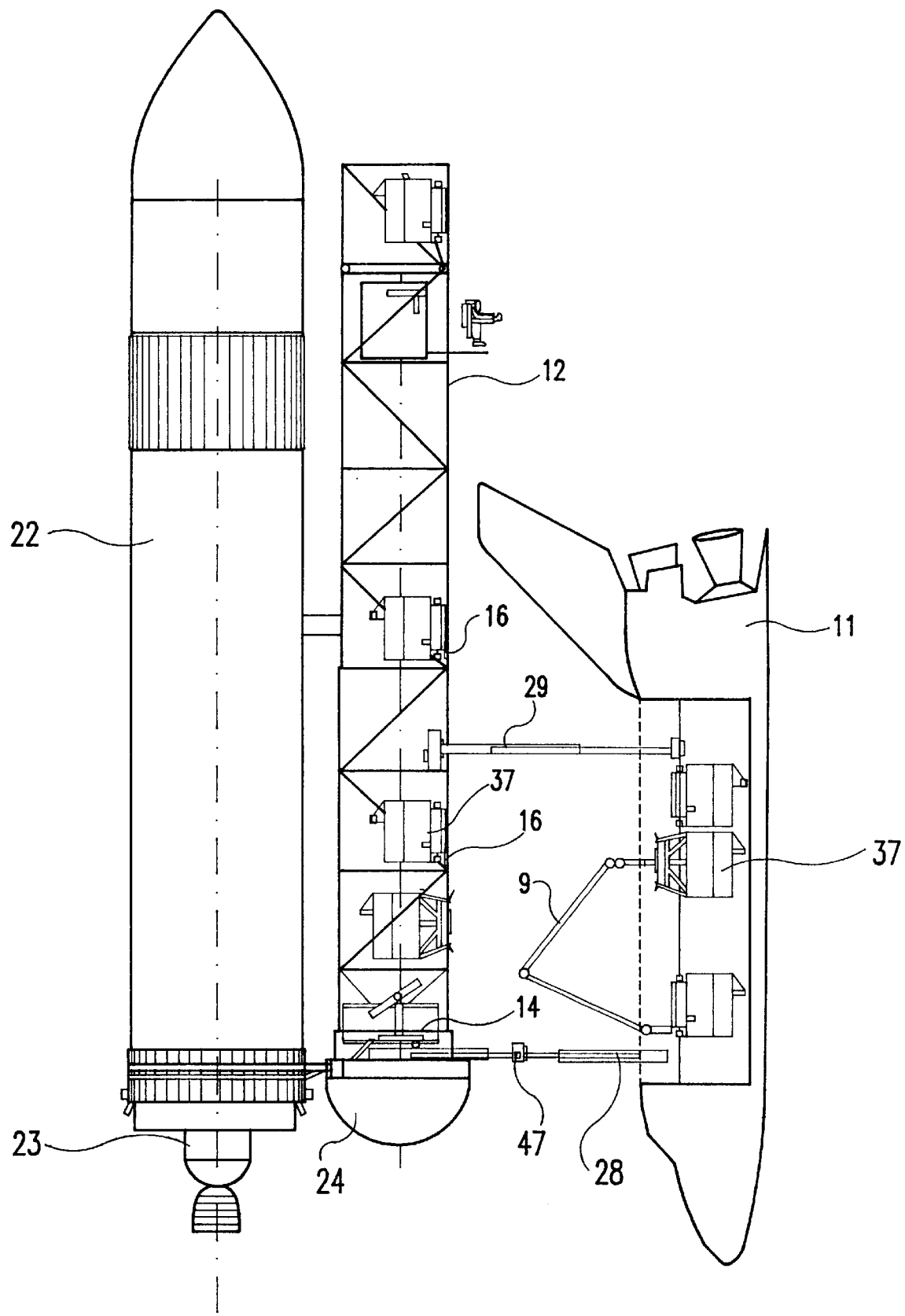
FIG. 4 is a side view of the compressed salvage subsystem of FIG. 3 that is expanded in orbit.

FIG. 4 is a side view of the ENERGIA rocket system after the truss 12 has been extended from the on-board salvage subsystem package 14. Additional payloads 37 may be manipulated by the RMS 9 and plugged-in to respective nodes 16. Also shown is spar pole 29 in its extended position providing a rigid attachment between the shuttle 11 and payload carrier 24.

The coupling testbed 47 is part of the interface between the spar poles. In addition to the main coupling between the spar poles, the coupling testbed allows for development and orbital testing of connections, couplings, and other devices in actual space conditions, thereby avoiding having to over-design a component to ensure that it will work in space the first time.

The salvage subsystem package 14 may provide for attitude control, re-entry and other services including utilization of the on-board rocket engines 23 on the central core 22 in conjunction with the salvage subsystems.

Figure 5:
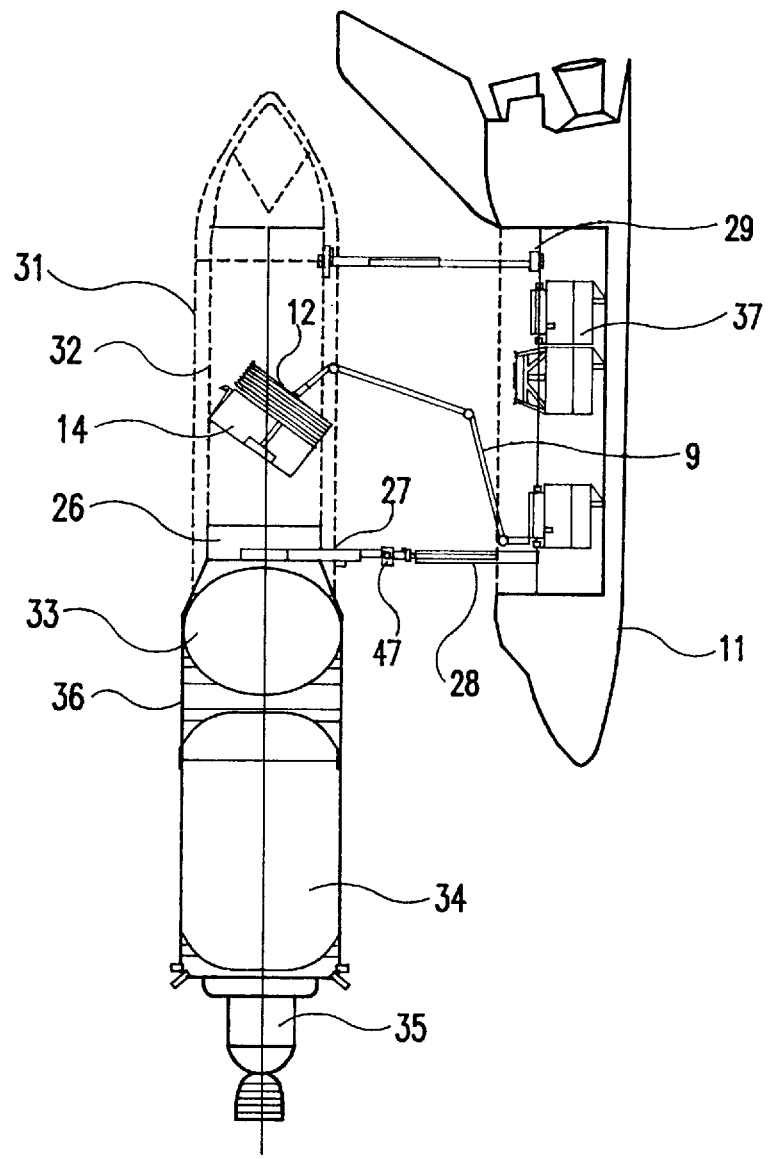
FIG. 5 is a side view of a compressed salvage subsystem being placed on a Russian-made ENERGIA M rocket.

FIG. 5 is a side view of an alternate version of the Russian-made rocket, the ENERGIA M. The ENERGIA M vehicle comprises an ejectable shroud 31, payload volume of ejectable payloads 32, and liquid propellant containers 33 and 34 feeding the engines 35.

The salvage operation for the ENERGIA M central core 36, which is currently discarded on each mission, is again accomplished by the Space Shuttle 11 using the Remote Manipulator System (RMS) Arm 9 to first hook up the non-rigid spar pole 28 from the Space Shuttle 11 to the pre-installed spar pole 27 launched on the ENERGIA M carrier in pre-installed package 26.

As in the previous embodiment, the salvage package 14 and truss 12 are later expanded to provide attitude control, re-entry and other services to the combination of systems. The spar pole 29 is extended after the deployable truss 12 is extended and the payloads 37 are transferred back and forth.

Figure 6:
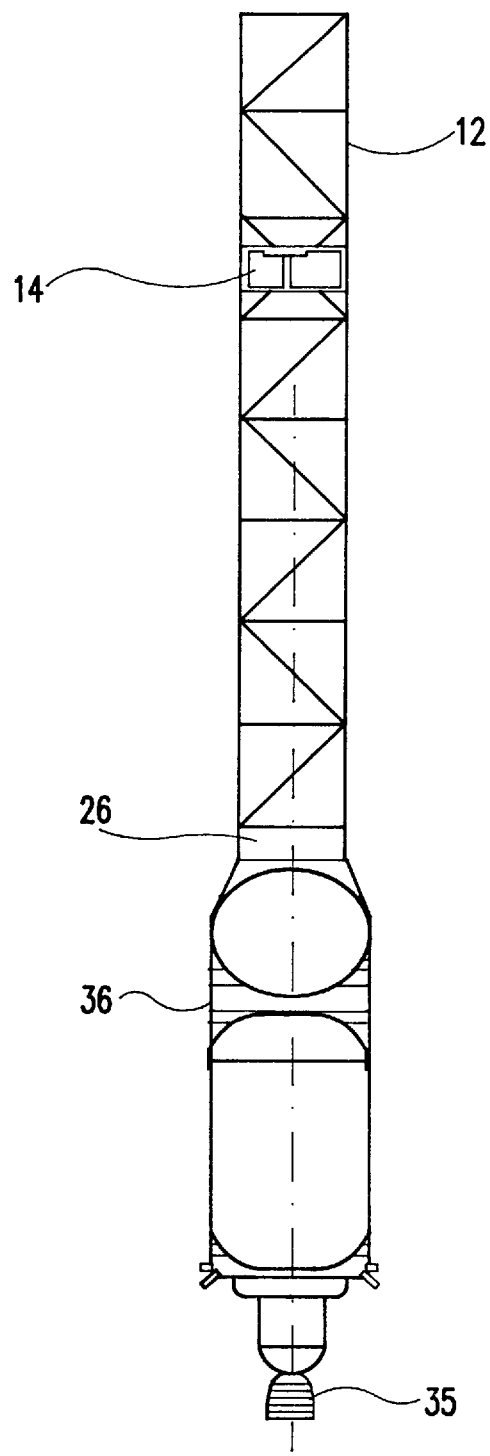
FIG. 6 is a side view of the compressed salvage subsystem of FIG. 5 that is expanded in orbit.

FIG. 6 is a side view of the ENERGIA M central core 36 after the truss 12 has been extended from the on-board salvage subsystem package 14. The salvage package 14 provides attitude control, re-entry and other services including an interface and deployment of the on-board rocket engines 35 on the central core 36.

FIGS. 7A–7C are assembly views of the subsystem package 14 positioned in orbit with RMS attachment boom 38 with swing-out 39. For the external tank embodiment in FIGS. 1 and 2, the solid rocket booster (SRB) fitting attachment mechanism 40 is used for the attachment to the forward SRB fitting on the external tank (not shown on this drawing). The subsystem package 14 supplies attitude control system nozzles 41a, 41b, 41c, 41d and 41e, boost/de-orbit phase nozzle 42, and propellant tanks 43. The power system contains 4 to 10 kw solar power arrays 44 and supporting structure. Also included is a deployable communications antenna 45.

The half pallet structure carrier 47 contains recessed pallet subsystems hardware 48 and has a pallet payload envelope 49. In addition to being recessed within the pallet structure, the system components may also be mounted on the structural end plate 46.

Figure 8:
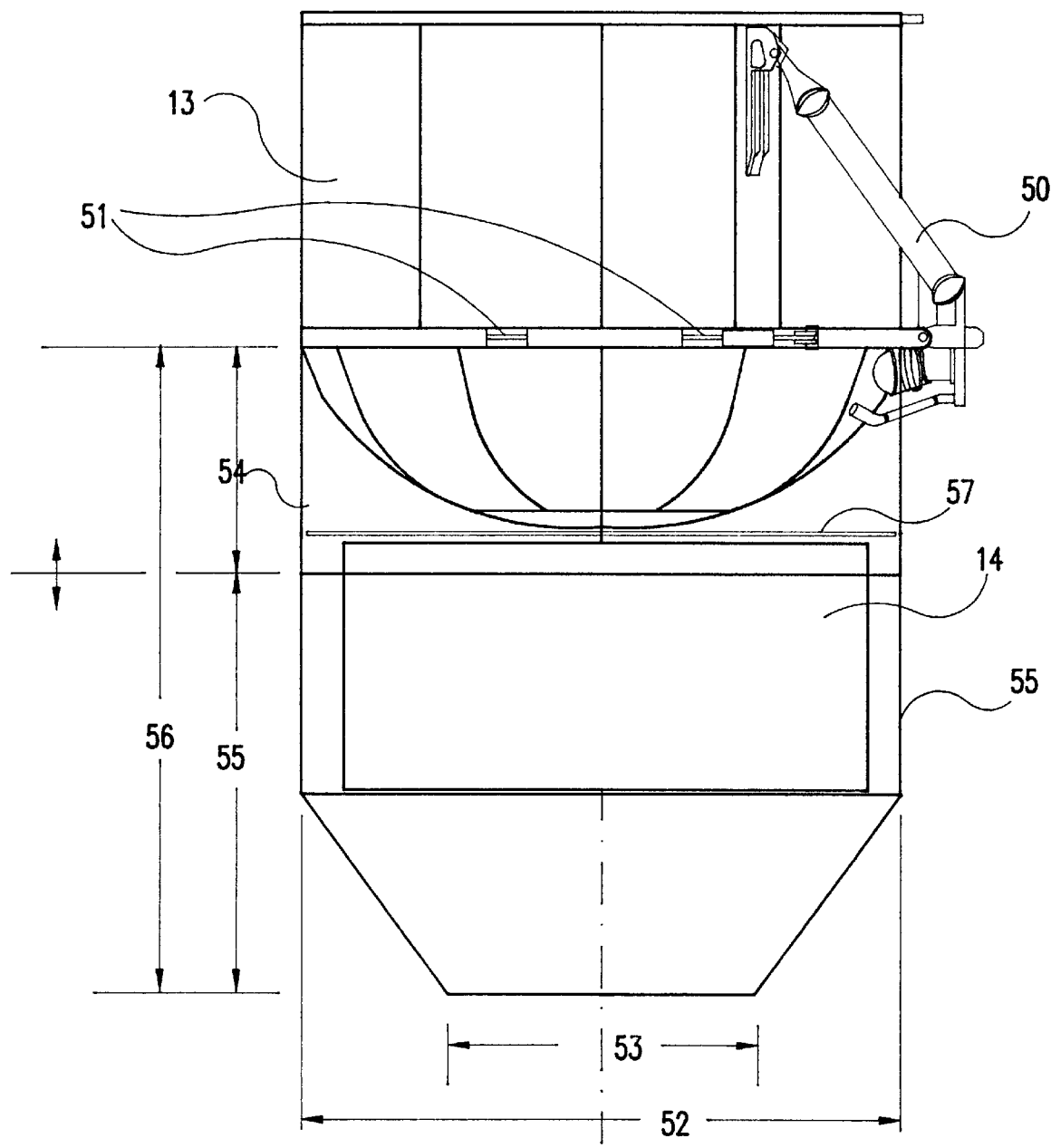
FIG. 8 is a side view of an alternate attachment point for the compressed salvage subsystem showing an aft commercial shroud attached to the external tank.

FIG. 8 depicts an alternate salvage subsystem embodiment using an aft commercial shroud (ACS) attached to the external tank 13 or other salvageable object using a subsystem package 14 in the ejectable aft shroud pod 55. The ACS system is made up of a skirt 54 of approximately 10 feet in length by 27 feet in diameter, payload attachment frame 57, and an ejectable shroud 55 that is approximately 27 feet in diameter by 20 feet long. The total length 56 of the ACS is approximately 30 feet long. The width 52 of the ACS is the same diameter as the external tank 13 and is constricted to diameter 53. The external tank also contains aft SRB fittings 51 and aft shuttle attached hardware 50.

Figure 9:
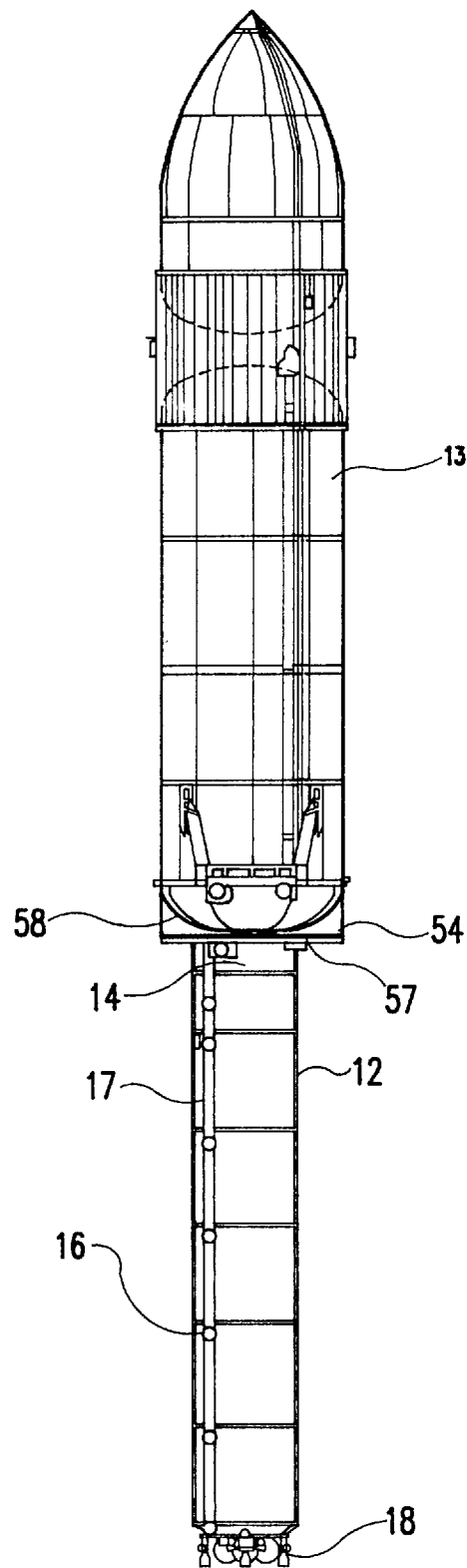
FIG. 9 is a side view of the compressed salvage subsystem of FIG. 8 that is expanded on orbit.

As shown in FIG. 9, the subsystem package 14 is expanded from the aft end of the external tank 13 from its position on payload frame 57 providing another alternative for the salvage of the tank. The salvage package 14 is connected to the external tank 13 and space shuttle subsystems through connection device 58. The deployable truss 12 contains a utility network 17 and attachment nodes 16.

Figure 10:
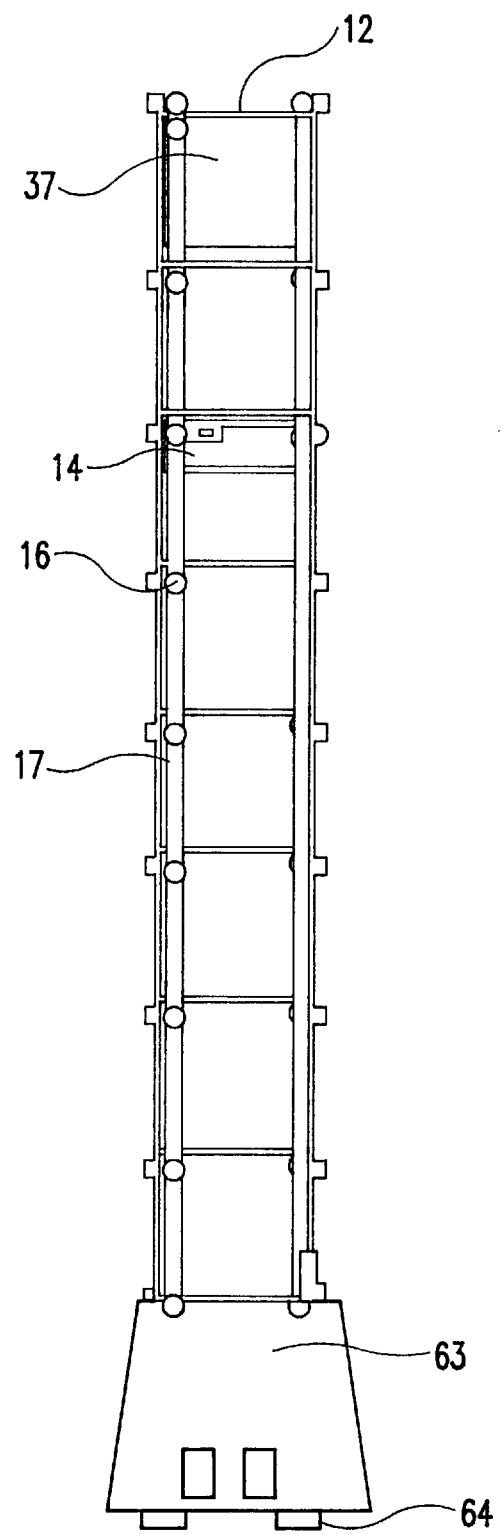
FIG. 10 is a side view of the DC-X or other vehicle that can be salvaged in orbit using the subsystem package technique, which is added and/or expanded on orbit to permit the interface with later vehicles and provides attitude control, re-entry and other services including development of the on-board rocket engines on the vehicle to the combination of systems.

In FIG. 10, a DC-X 63, manufactured by McDonnel Douglas, or other space vehicle can be salvaged in orbit using the salvage subsystem package 14, which is added and/or expanded on orbit to permit the interface with later vehicles and provides attitude control, re-entry and other services including interfacing the system components with the on-board rocket engines 64 on the space vehicle 63. The truss 12 accepts payloads 37 for plug into the utility network 17 at attachment nodes 16.

Figure 11:
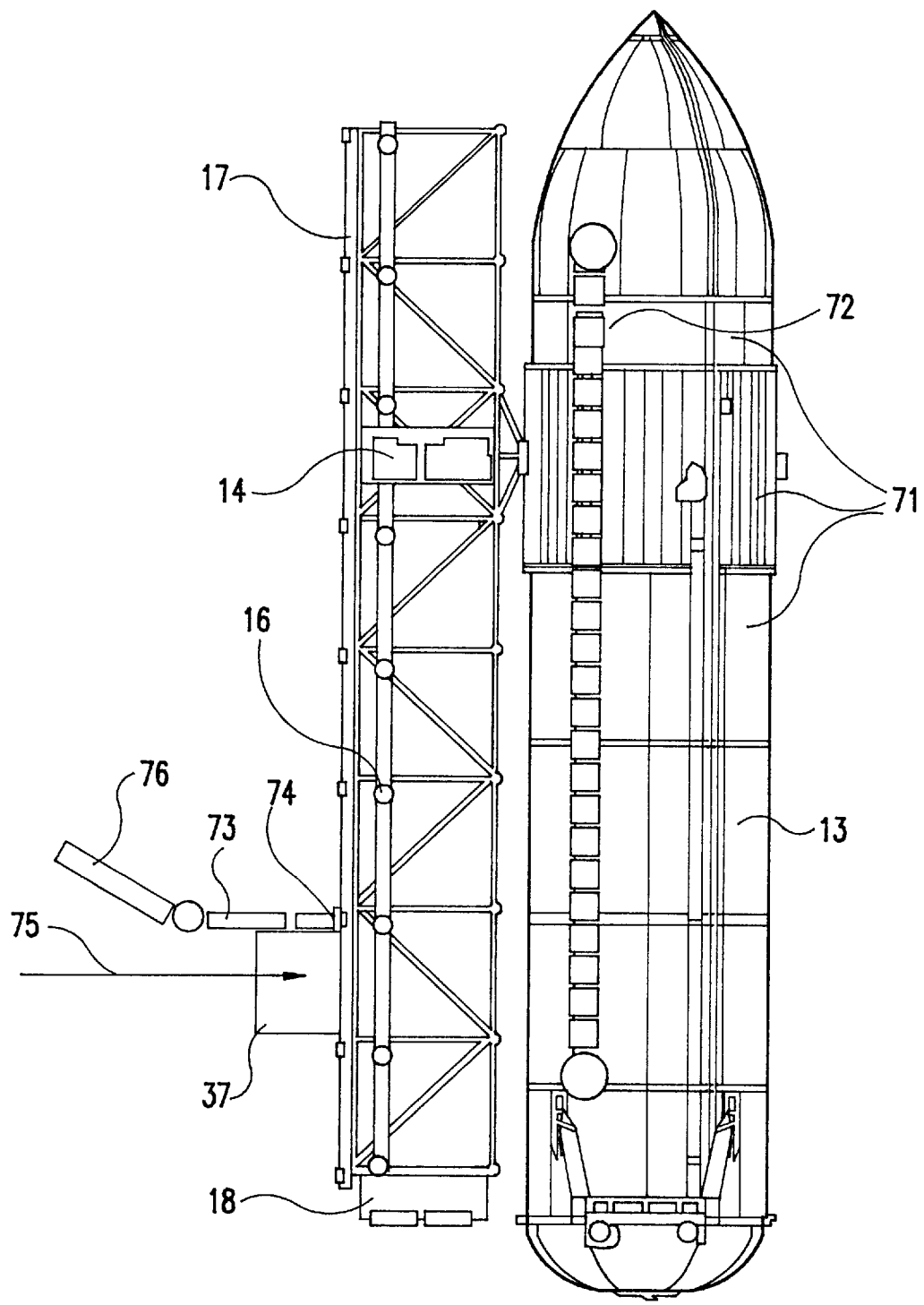
FIG. 11 is a side view of the payload plug in technique using an on-board robotic arm or a space shuttle Remote Manipulator System (RMS) arm to make the mechanical, power and communications attachment in one step.

Depending on the use and mission of the salvageable item, additional elements, features, or components may be added to the salvage subsystem 14. FIG. 11, for example, illustrates a payload plug-in apparatus 75 and technique using an on-board robotic arm 76 or the space shuttle RMS 9 to make the mechanical, power and communications attachment 74 in one step.

The external tank 13 is salvaged with package 14 providing utility network 17 with nodes 16 for the attachment of payloads 37 using a technique of interface 75, which uses a special end effector 73 of the RMS to make the connection. The end effector 73 is able to grasp connector 74 that is structurally built into the payload 37. The payload 37 may then be attached to the truss platform 12, with the connection 74 providing structural, electrical, communications, and utilities from the truss structure to the payload. The other attributes of the salvaged item include interior volumes 71 and strongback attributes providing a track mounted robot 72 with a stable attachment location.

Figure 12:
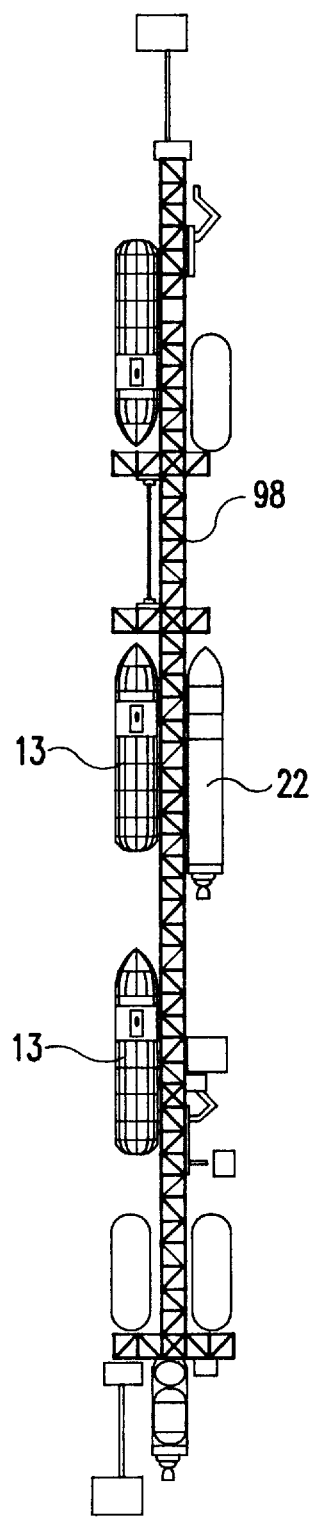
FIG. 12 is a side view of the embodiments of FIGS. 2, 4, and/or 6 that are connected to provide a combined length and mass used to develop a natural gravity gradient stability of the salvaged items.

FIG. 12 illustrates one embodiment for a combined length and mass platform 98 using salvaged external tanks 13 and ENERGIA central cores 22 to develop a natural gravity gradient stability of the salvaged items. The long axis of the platform system remains pointed toward the center of the earth or other body as it rotates around the larger body and remains stable without significant additional propellant.

When aligned with its long axis pointing toward the center of the earth, the external tank is long enough such that divergent forces are created since the upper end of the tank travels in a higher orbit than the end close to the earth. The upper end wants to travel faster to attain a steady state orbit and the lower one wants to travel slower. Since they are both attached to the same long mass, a tension is created that cancels these divergent forces and keeps the external tank stable. These forces, so-called gravity gradient forces, align the tank so that the long axis always points towards the earth. Since the external tank is above the atmosphere there are no aerodynamic forces, therefore, the tank does not tumble like most shorter objects would. This substantially reduces the need for reaction control system propellants.

It is understood that many different combinations of salvageable material may be incorporated in a system such as that shown in FIG. 12 within the practice of this invention.

Figure 13:
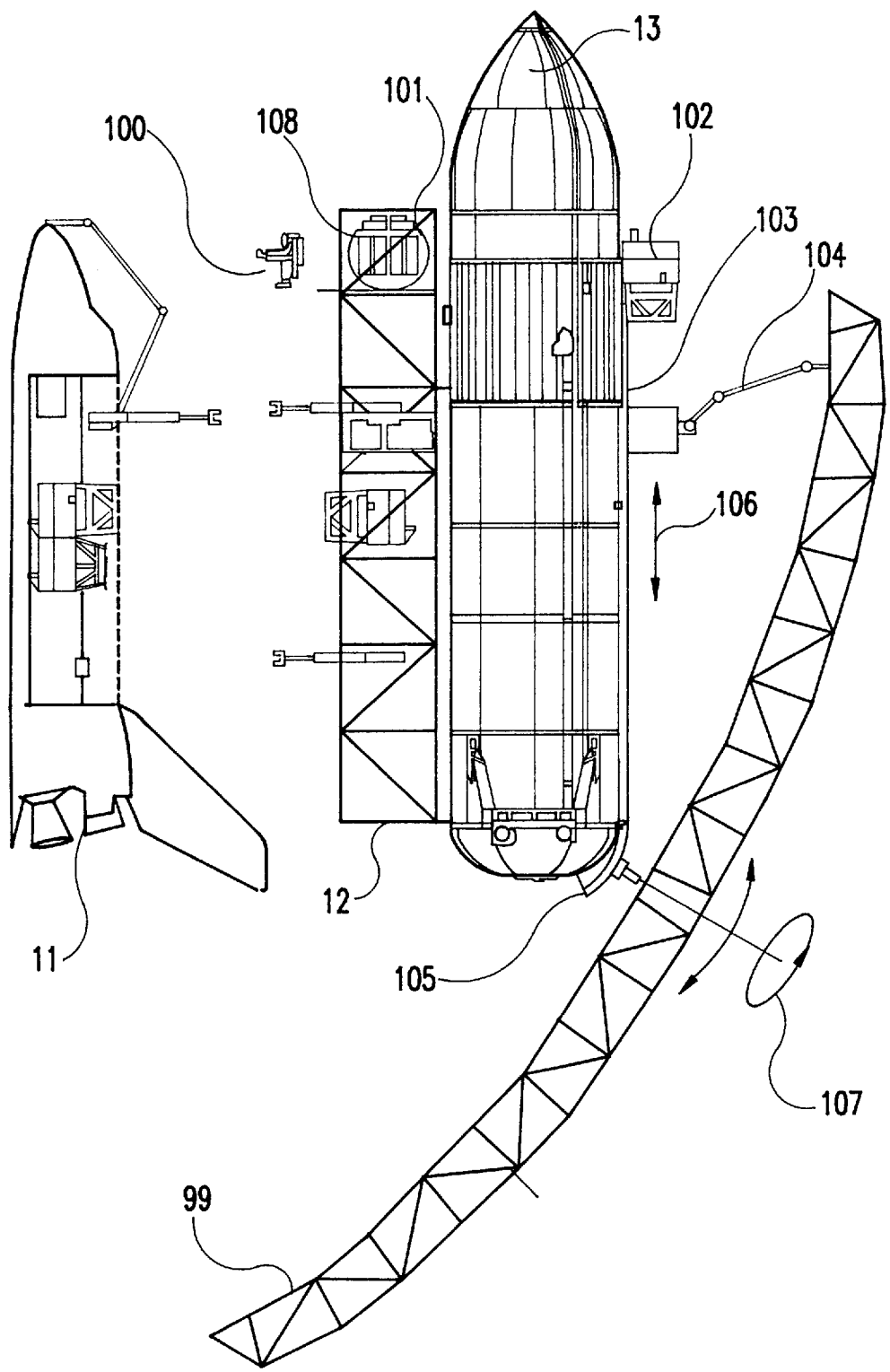
FIG. 13 is a side view of the use of a salvaged item used as a strongback to assemble a large space structures antenna using an on-board track mounted robotic device and turntable.

The orbit salvaged materials may be effectively utilized in building space structures, with significant savings in time, money, and manpower. FIG. 13 is an example of just such a use. There is shown a salvaged external tank 13 that is used as a strongback for track 103 on which robotic assembly 104 travels as it assembles truss elements from storage 102 into parabolic truss antenna 99. This large space structure antenna 99 uses the on-board track mounted robotic device 104 and a turntable 105 with a travel 106 of 110 degrees and a rotation 107 of 360 degrees. The turntable 105 is track mounted on and travels around the 0.75 ellipsoid dome of external tank 13 to provide a tilt to the construction process.

To aid in the construction of large space structures, the Manned Maneuvering Units (MMU's) 108 are sheltered in an unpressurized SPACEHAB Module 101 attached to truss 12. The astronaut crew member 100 uses the truss 12 square box truss structure as an Extra Vehicular Activity (EVA) development volume in front of the SPACEHAB Module 101. The space shuttle 11 supplies the materials and crew members in periodic re-visits.

In summary, the present invention provides numerous opportunities to effectively utilize current and future discarded objects in orbit. Rather than waste the orbiting assets, the present invention is adaptable to provide the salvage subsystems needed to effectively employ these assets.

Significant efficiencies and cost savings are achieved in a number of areas including recurring launch costs and manpower costs associated with building orbiting systems. Another cost saving is that the launch of a space hardware item previously designed for one use may be reused for a different purpose in orbit. This reduces the cost of doing business in orbit by using a derelict as a portion of an orbital platform. Also, the assets of the salvageable such as the existing propellants and system components may be more effectively utilized.

The salvage hardware and techniques reduce the cost of launching similar hardware to orbit and provides a stable place in orbit for the conduct of business, research, and the expansion of mankind's movement off the planet in search of resources.

While the invention has been described in terms of the embodiments described above, those skilled in the art will recognize that the invention can be practiced with modification within the spirit and scope of the appended claims.

Having thus described my invention, what I claim as new and desire to secure by Letters Patent is as follows:

1. A method of placing a separate salvage subsystem package on a discarded orbiting object for salvaging the discarded orbiting object, the method comprising the steps of:

identifying a discarded orbiting object;

launching the separate salvage subsystem package including a compressed truss apparatus;

coupling the salvage subsystem package and compressed truss apparatus to the discarded orbiting object;

extending the compressed truss apparatus to provide a utility network with attachment points for payloads at a plurality of nodes for connection to a corresponding plurality of control systems provided by the salvage subsystem package; and activating and controlling the plurality of control systems provided by the salvage subsystem package.

2. The method as in claim 1, wherein the coupling step includes attaching the salvage subsystem to a pre-existing attachment means on said discarded orbiting object.

3. The method as in claim 1, wherein the coupling step further includes the step of installing an attachment means on said discarded orbiting object prior to coupling the salvage subsystem package to the discarded orbiting object.

4. The method as in claim 1, wherein the coupling step couples the salvage subsystem package to a pre-existing salvage package on said discarded orbiting object.

5. The method as in claim 1, wherein the activating and controlling step includes providing attitude control for the discarded orbiting object.

6. The method as in claim 5, wherein the step of providing attitude control includes providing an interface between the salvage subsystem package and an existing attitude control means on said discarded orbiting object.

7. The method as in claim 1, wherein the activating and controlling step includes providing propulsion control of the discarded orbiting object.

8. The method as in claim 7, wherein the step of providing propulsion control includes providing an interface between the salvage subsystem package and an existing propulsion means on said discarded orbiting object.

9. The method as in claim 1, wherein the activating and controlling step includes providing communications control of the discarded orbiting object.

10. The method as in claim 9, wherein the step of providing communications control includes providing an interface between the salvage subsystem package and an existing communications control means on said discarded orbiting object.

11. The method as in claim 1, wherein the activating and controlling step includes supplying electrical power control to the discarded orbiting object.

12. A salvage subsystem package attached to a discarded orbiting object for salvaging the discarded orbiting object, the package comprising:

attitude control means for controlling the attitude of the discarded orbiting object;

communications means for controlling the communications of the discarded orbiting object;

power means for supplying electrical power to the discarded orbiting object; and extendable truss means, extendable to provide a utility network with attachment points for payloads at a plurality of nodes for connection to at least one of the group consisting OF said attitude control means, said communication means, and said power means.

13. The apparatus as in claim 12, further comprising propulsion means for controlling the propulsion of the discarded orbiting object.

14. The apparatus as in claim 12, wherein said discarded orbiting object is an external tank of an aerospace vehicle in orbit and said salvage subsystem package is coupled to an attachment device on said external tank.

15. The apparatus as in claim 14, wherein said salvage subsystem package is attached in an aft shroud of said external tank.

16. The apparatus as in claim 12, wherein said discarded orbiting object is a discarded component of an aerospace launch vehicle or satellite capable of salvage in orbit and said salvage subsystem package is coupled to an attachment device on said aerospace launch vehicle or satellite.

17. The apparatus as in claim 12, further comprising means for expanding an on-board subsystems salvage package for controlling the discarded orbiting object.

18. The apparatus as in claim 12, further comprising a plug in/plug out means from a payload to said utility network to transfer power and communications.

* * * * *